A. W. THOMPSON.
APPARATUS FOR DYEING, BLEACHING, &c.
APPLICATION FILED APR. 2, 1909.
926,782.
Patented July 6, 1909.
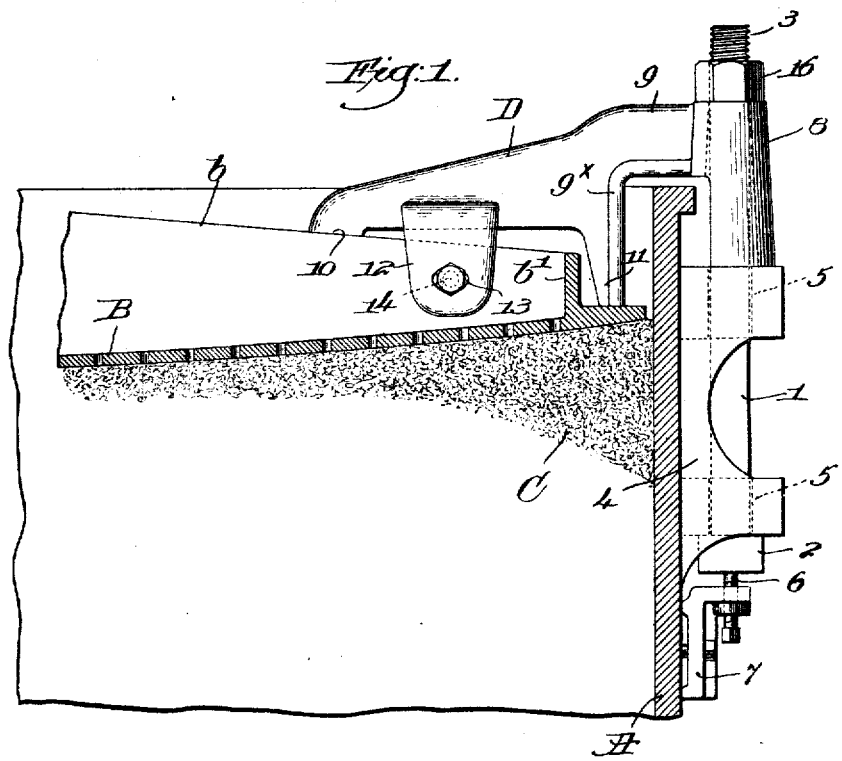
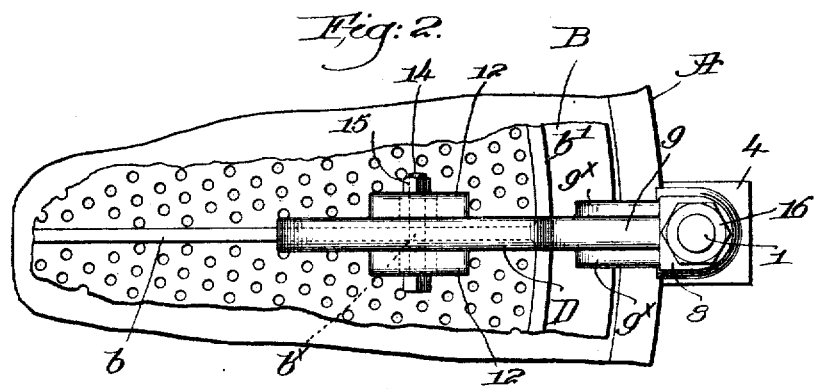
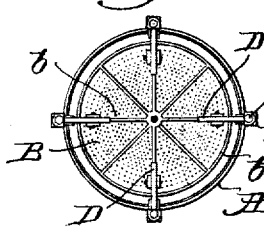
Witnesses,
Edward F. Allen
Joseph M. Ward.
Inventor:
Albert W. Thompson,
by Crosby Gregory.
Attys.

UNITED STATES PATENT OFFICE.

ALBERT W. THOMPSON, OF MANCHESTER, NEW HAMPSHIRE.

APPARATUS FOR DYEING, BLEACHING, &c.

No. 926,782.   Specification of Letters Patent.   Patented July 6, 1909.

Application filed April 2, 1909. Serial No. 487,548.

*To all whom it may concern:*

Be it known that I, ALBERT W. THOMPSON, a citizen of the United States, and resident of Manchester, county of Hillsboro, State of New Hampshire, have invented an Improvement in Apparatus for Dyeing, Bleaching, and the Like, of which the following description, in connection with the accompanying drawing, is a specification, like characters on the drawing representing like parts.

My present invention relates to that type of apparatus for dyeing, bleaching or otherwise treating material to the action of a circulating liquor, in which the material to be treated, such for instance as raw cotton, is placed in a large open vat, made of cast iron, and after being compressed into the vat is held therein by a strong metallic cover plate. This plate is then secured in position and by suitable pumping apparatus the liquor is forced into the vat at the bottom and driven upward through the mass of material, the liquor escaping through perforations in the cover or compression plate and passing thence back to the pump to be again forced into the vat. Such apparatus has to be constructed of great strength to withstand the pressures to which it is subjected, and the means for holding down the compression plate must be sufficiently powerful to hold the plate against the upward pressure. In apparatus of this type it is customary to mount a series of upright rods on the side wall of the vat, to enter apertured hubs of dogs which are downturned to overhang the lip of the vat and bear against the top of the compression plate, at or near its periphery, and sometimes the dogs are cast integral with the plate, the dogs being held down upon the rods by means of wedges or by nuts screwed onto the rods above the hubs. Either of these means for holding down the plate is objectionable in actual practice, for several reasons.

When the dogs are cast integral with the plate the breakage of a dog renders the plate worthless, as it cannot be held properly in position, and the dogs must be very accurately placed on the plate in order to properly receive the rods on the vat. The usual form of separate dogs is, however, much more objectionable in practice, such dogs having each a hub to receive the rod and an inwardly extended, downturned portion to overhang the lip of the vat and bear upon the top of the compression plate. When these dogs are used one of two cases is present, supposing that the upright rods are provided with nuts to hold the dog hubs down against upward pressure on the compression plate. First, when the nut is screwed down until the lower end of the hub bears on the rod-supporting bracket the lift of the plate applied to the inner end of the dog tends to cause rotation about the bearing point of the hub on the bracket, and thereby applying a greatly multiplied bending and prying strain upon the rod and nut. Second, when the nut is not screwed down so far a clearance space is left between the bottom of the hub and the top of the rod-bracket.

The tendency to rotate, above referred to, still exists, due to the upward pressure of the plate upon the inner end of the dog, and the lower end of the hub bears against the outer side of the rod while the upper end of the hub bears against the inner side of the rod, resulting in a very heavy bending strain on the rod, localized at the center of rotation, viz:—at the lower end of the hub. As a result of these strains bent and broken rods have been a matter of constant occurrence, so that the rods were in frequent need of replacement or repairing, and not only that but the dogs themselves would frequently break owing to the strain to which they were subjected.

My present invention has particular reference to the means for holding the compression plate in operative position, in apparatus of the type previously specified, and it has for its object the production of novel holding means of improved and efficient construction whereby I have eliminated the objectionable features of holding devices now in common use.

The various novel features of my invention will be fully described in the subjoined specification and particularly pointed out in the claims annexed thereto.

Figure 1 is a partial section and elevation of a portion of a vat and the compression plate therefor, with holding means applied thereto embodying one form of my present invention; Fig. 2 is a top plan view of the structure illustrated in Fig. 1; Fig. 3 on a smaller scale is a top plan view of the vat and compression plate, showing the arrangement of the holding means for the plate.

Referring to the drawings, A indicates the vat of a dyeing or similar apparatus of the type referred to, and B is the compression plate to hold the material C, Fig. 1, under compression during treatment, said plate in practice being usually dished, and perforated, the plate having on its upper face radial stiffening and strengthening ribs $b$ terminating in an annular upright lip $b'$ shown as adjacent the peripheral edge of the plate.

The parts of the apparatus so far described are of well known construction, the plate fitting within the open top of the vat and holding therein the cotton or other material to be subjected to the action of liquor circulated through the vat and the material.

I will now describe my novel and improved means for holding the compression plate in position against the powerful upward thrust to which it is subjected. A series of upright downhold members, shown as strong rods 1 headed at their lower ends at 2 and threaded at their upper ends, as at 3, Fig. 1, are mounted upon the exterior of the vat, the latter having secured to or formed upon its side walls brackets 4 provided with openings 5 through which the rods are loosely extended. The head 2 of a rod abuts against the bottom of the bracket and is held from dropping by a set-screw 6, Fig. 1, mounted in a stand 7 bolted to the vat, this arrangement permitting a broken rod to be readily replaced, it being understood that as the rods 1 are subjected to tension strains when in use the stands 7 and set-screws 6 support only the weight of the downhold rods. As shown in Fig. 1 the upper ends of said rods extend above the upper edge or lip of the vat and are adapted to enter loosely hollow hubs 8, each formed integral with and depending from a radial extension 9 of a dog D, a plurality of such dogs being connected with the plate B. Each dog D in practice is preferably made as a heavy casting having inner and outer feet 10, 11 adapted respectively to rest upon the top of a rib $b$ and upon the plate outside the lip $b'$, the elongated body of the dogs extending radially upon the top of the plate. Between the legs the dog is provided with opposite depending ears 12 which straddle and receive loosely between them the radial rib $b$ of the compression plate on which the dog is mounted. An elongated slot 13 is formed in each ear, to receive a headed attaching bolt 14 passed through the two ears and through a hold $b^\times$, see dotted lines Fig. 2, in the rib, said bolt being secured by a nut 15. The detachable connection thus formed between the compression plate and a dog not only permits the dog to be removed in case of breakage and a new one substituted, but it also permits a limited radial movement of the dog and a slight pivotal movement thereof. So, too, as the distance between the ears is greater than the thickness of the rib $b$ of the plate B, as shown in Fig. 2, there is some lateral play permitted to the dog, which various movements enable the dog to be readily positioned to enable the downhold rod 1 to easily enter the hub 8. That is, there is no such absolute accuracy required in the positioning of the rods and dogs on the vat and compression plate, respectively, as would be necessary were said parts rigidly or permanently attached to the vat and the plate. The extension 9 of the dog is stiffened and strengthened by a lateral flange $9^\times$, as shown, the extension overhanging the side wall of the vat to bring the hub in proper position relatively to the downhold member with which it is to coöperate.

In practice the vat is filled with the material and the latter is pushed or pressed down in any convenient manner, after which the plate B is swung into position over the vat by suitable tackle, (not shown) and lowered until the several rods 1 enter and pass up through the hubs of the dogs. The plate must now be secured in position and for this purpose heavy nuts 16 are screwed onto the threaded ends 3 of the downhold members, the nuts being set up against the hubs and forcing them and the compression plate downward to the position shown in Fig. 1. The plate is thus firmly and securely held in place, the nuts 16 maintaining the dogs and the downhold members in coöperation during the circulation of the liquor through the vat and the material contained therein.

From an inspection of Fig. 1 it will be seen that the upward thrust of the plate B is transmitted to each dog through the separate feet 10 and 11 thereof, tending to obviate any twisting strain upon the dog or upon the coöperating downhold rod, so that there is practically no bending strain exerted upon the latter. That is, the upward pressure of the plate upon the foot 11 has a tendency to tip or rotate the dog about the lower end of the hub 8, whether said hub is resting upon the top of the bracket or is somewhat above it, but this tendency is completely nullified by the connection 14 between the dog and the plate, intermediate the foot 11 and the center of the plate. As a result the uplift of the dog and its hub 8 is in a direction parallel to the axis of the coöperating rod 1, just as if the dog were integral with the plate, and there is no tendency to bend or break the rod nor is there any tendency to tilt and pry off the nut, as will be manifest. While I thus secure the advantage attendant upon the use of dogs integral with the plate I obviate the disadvantages thereof, and eliminate the objectionable features present in the separate dogs now in use while providing for the ready replacement of a dog should it break by any accident or by reason of some inherent weakness in the casting.

By my novel construction I also provide for a better distributed and reduced strain upon the dogs themselves, and in actual practice apparatus equipped with the novel structure herein described have been successful in the highest degree, as no repairs or breakage of either dogs or downhold rods have been required. Should a dog be too far in or out when the plate B is positioned on the material in the vat, so that the hub does not exactly register with its proper downhold rod, the dog can be slid in or out to correct position, as required, and it can also be moved laterally more or less if necessary, without requiring any bodily movement of the plate itself, and without in any way interfering with the operation of the apparatus. This is of great value in practice as it enables the compression or cover plates to be applied and secured much more quickly and easily than would be possible otherwise, as will be apparent. Should a dog break the plate is not thereby rendered worthless, for the broken dog is detached and a new one is applied in its place.

The dogs herein described can be readily applied to compression plates now in use by simply drilling holes in the radial ribs thereof to receive the connecting bolts 14. While in Fig. 3 I have shown four dogs and their coöperating downhold members my invention is not thereby restricted to such an arrangement, as a greater or less number may be employed according to circumstances, and various changes or modifications may be made by those skilled in the art without departing from the spirit and scope of my invention as set forth in the claims annexed hereto.

Having fully described my invention, what I claim as new and desire to secure by Letters Patent is:—

1. In apparatus for dyeing, the combination with a vat to contain the material to be treated, and a compression plate or cover for the material, of means to hold the plate in position, said means comprising a plurality of upright rods fixedly attached to the exterior of the vat, a series of dogs detachably mounted on the plate and extended radially over the top of the vat, each dog having an upright hub to receive one of said rods, means to prevent tipping of the dogs when the plate is subjected to upward pressure, and nuts to retain the hubs in position on the rods.

2. In apparatus of the class described, the combination with a vat to contain the material to be treated, and a radially-ribbed compression plate for the material, of a series of holding dogs each having at its outer end a hub extended beyond the vat, and a foot bearing upon the plate between the hub and the connection of the dog with the plate, a rocking and sliding connection between each dog and a rib of the plate, a series of upright downhold rods externally mounted on the vat and adapted to enter the hubs of the dogs, and means to retain the hubs in position on the rods.

3. In apparatus of the class described, the combination with a vat to contain the material to be treated, and a compression plate for the material, radially ribbed on its upper face and provided with an annular, upright lip set in from its edge, of a series of holding dogs, each dog having depending ears to straddle loosely a rib between the feet of the dog, inner and outer feet to rest on the rib and on the plate outside the lip, respectively, and an upright hub on the outer end of the dog outside the wall of the vat, a detachable, radially slidable connection between the ears of each dog and the adjacent rib of the plate, a series of upright downhold rods mounted on the exterior of the vat and adapted to enter the hubs of the dogs, and adjustable means to retain the hubs on said rods.

4. In apparatus of the class described, the combination with a vat to contain the material to be treated, and a compression plate for the material, of a plurality of upright downhold rods mounted on the exterior of the vat, a plurality of dogs detachably connected with the plate and radially extended above the side wall of the vat to coöperate with the rods, each dog having a bearing upon the plate between its connection therewith and the coöperating rod, and means to retain the coöperating portions of the dogs in position on the rods.

5. In apparatus of the class described, the combination with a vat to contain the material to be treated, and a compression plate for the material, of a plurality of holding dogs mounted on the plate and extended radially above the side wall of the vat, a pivotal and radially movable, detachable connection between each dog and the plate, a depending foot on each dog bearing on the plate between said connection and the outer end of the dog, downhold means mounted on the exterior of the vat to coöperate with the radial extensions of said dogs, and adjustable devices to maintain the dogs and said downhold means in coöperation.

6. In apparatus of the class described, the combination with a vat to contain the material to be treated, and a compression plate for the material, of a plurality of holding dogs mounted on the plate, each dog having a radial extension terminating in an upright hub, and a plurality of feet on each dog, the outer foot of each dog bearing upon the top of the plate near its periphery, a pivotal and radially movable, detachable connection between each dog and the plate, intermediate the center of the plate and the outer foot, a plurality of upright downhold rods mounted on the exterior of the vat and adapted to loosely enter the hubs of the dogs, the upper ends of said rods being threaded, and retaining nuts screwed onto the rods above the hubs to maintain the latter on the rods.

7. In apparatus of the class described, the combination with a vat to contain the material to be treated, and a compression plate for the material, of a plurality of holding dogs mounted on the plate, each dog having at its outer end a radial extension terminating in an elongated hub outside the vat, and having a depending portion bearing on the plate near its periphery, a loose, radially movable and detachable connection between each dog and the plate, upright downhold rods mounted on the exterior of the vat and adapted to enter the hubs, and means to retain the hubs in position on the rods.

8. The combination, with a vat to contain the material to be treated, and a compression plate to retain the material in the vat, of a plurality of upright downhold rods mounted on the exterior of the vat, a plurality of dogs carried by and detachably connected with said plate and coöperating each with a rod, means to prevent bending action of the dogs upon said rods when the plate is subjected to upward pressure, and devices to retain the coöperating portions of the dogs in position on the rods.

9. The combination, with a vat having a series of upright downhold rods mounted on its exterior, and a compression plate to retain in the vat the material to be treated, of a series of detachable dogs carried by the plate, each dog having a foot bearing on the plate and an upright hub at its outer end to receive a rod, a positive connection between each dog and the plate, intermediate the center of said plate and the foot bearing thereupon, and a retaining nut screwed onto each rod above the hub of the corresponding dog.

10. In apparatus of the class described, the combination with a vat to contain the material to be treated, and a compression plate for the material of a plurality of holding dogs carried by the plate and in engagement therewith near its periphery, a loose and radially movable, detachable connection between each dog and the plate, intermediate such point of engagement and the center of the plate, downhold members mounted on the exterior of the vat to coöperate with the dogs and hold the plate in position, and means to maintain said dogs in coöperation with the downhold members.

11. In apparatus of the class described, the combination with a vat to contain the material to be treated, and a compression plate for the material, of a plurality of upright downhold members mounted on the exterior of the vat, a corresponding number of radially extended dogs detachably mounted on the plate and adapted to coöperate with said members, means to prevent tipping or twisting of the dogs when the plate is subjected to upward pressure, and means to maintain the dogs and the downhold members in coöperation to retain the plate in position.

12. In apparatus of the class described, the combination with a vat to contain the material to be treated, and a compression plate for the material, of a plurality of upright downhold rods mounted on the exterior of the vat, a plurality of dogs each having a bearing on the top of the plate near its periphery and radially extended above the side wall of the vat to engage a rod, a positive connection between each dog and the plate, intermediate the center of the latter and the bearing, to counteract twisting of the dog when upward pressure is applied thereto by the plate, and means to retain the coöperating portions of the dogs in position on the rods.

In testimony whereof, I have signed my name to this specification, in the presence of two subscribing witnesses.

ALBERT W. THOMPSON.

Witnesses:
EDOUARD A. MARTEL,
GEO. H. WARREN.